Sept. 4, 1934.  W. L. LIBBY  1,972,595
AUTOMATIC CUT-OFF MACHINE
Filed June 30, 1931   4 Sheets-Sheet 4
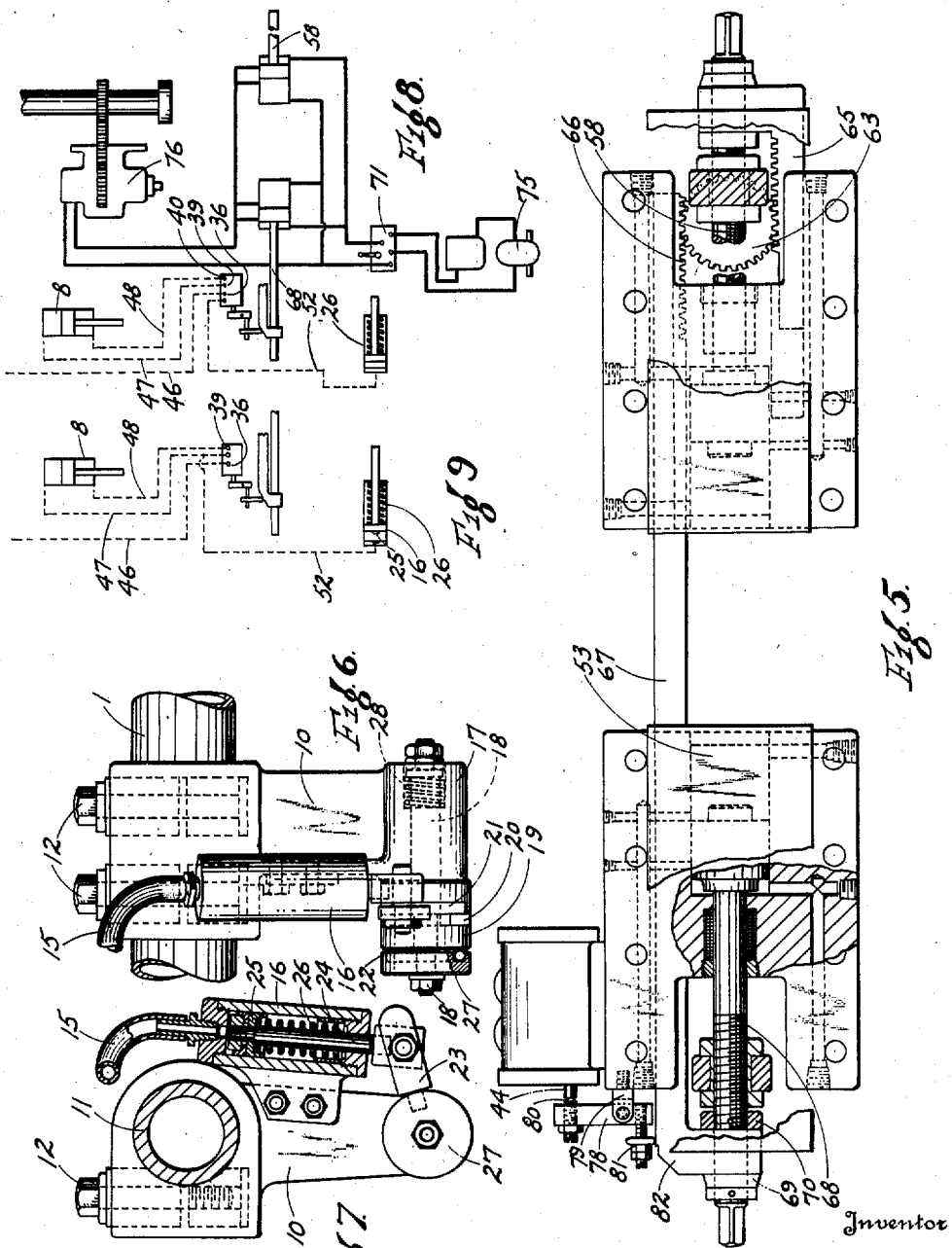
Inventor
WILLIAM L. LIBBY.
By Ricky & Watts
Attorney Patented Sept. 4, 1934

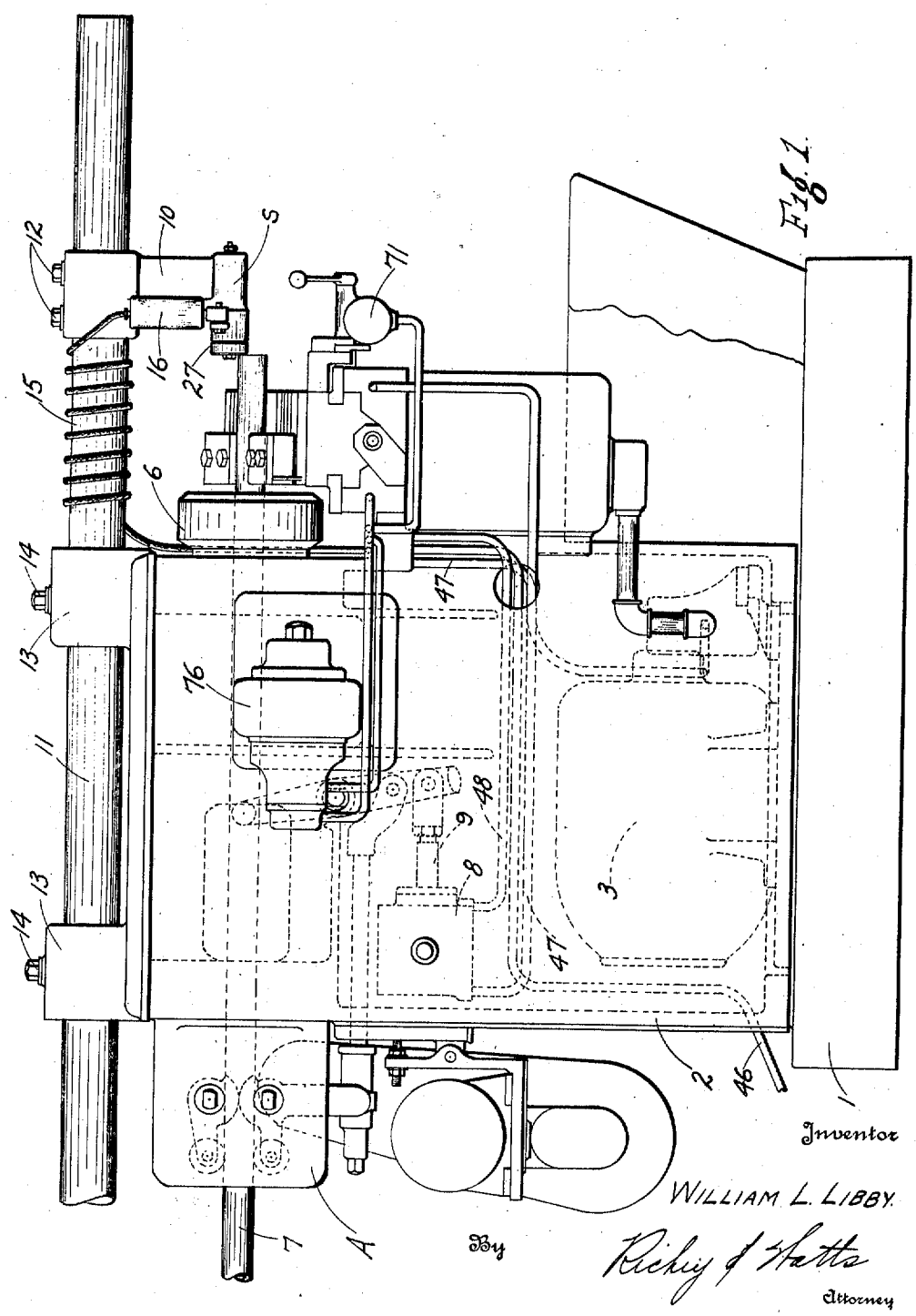

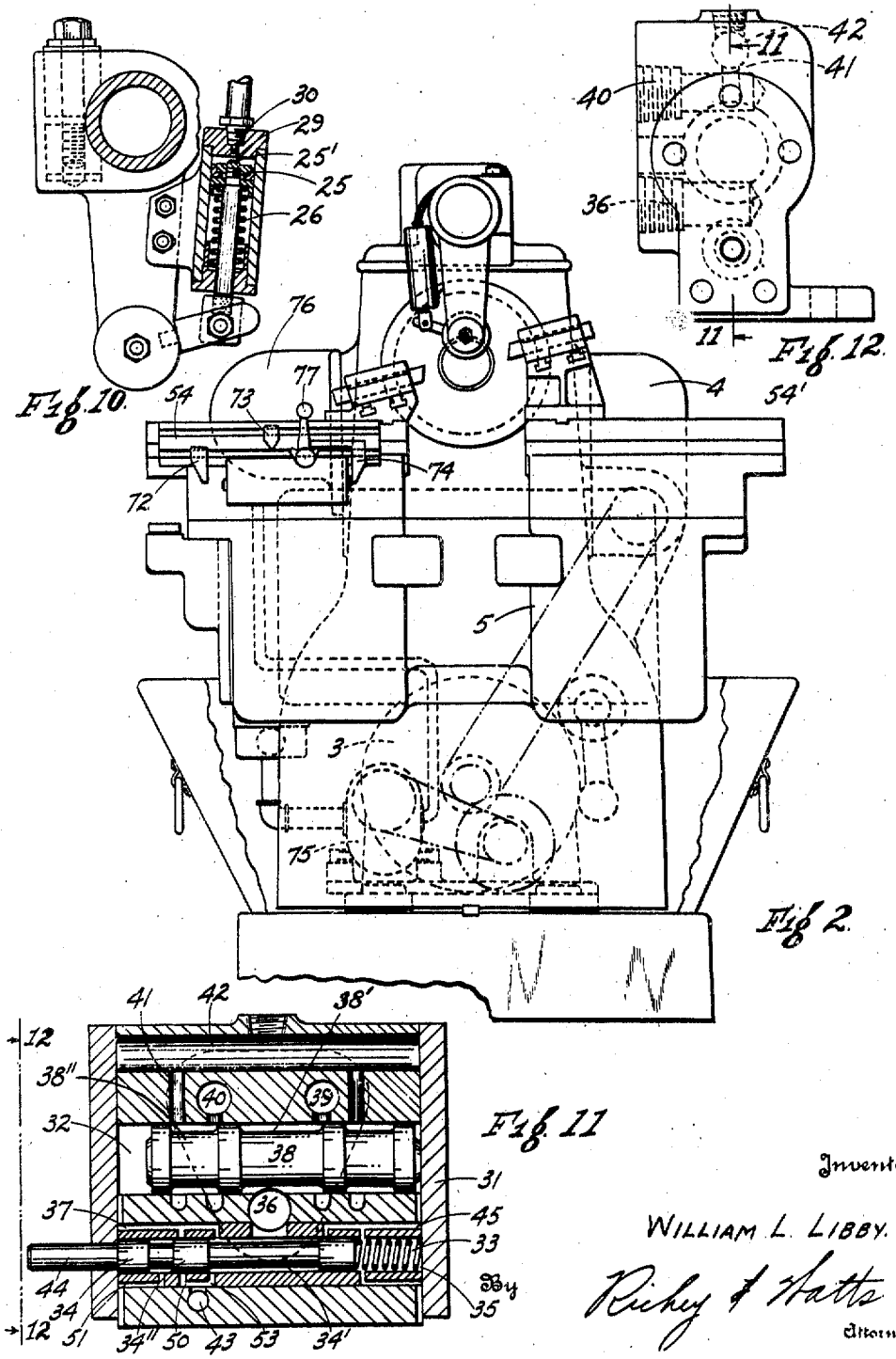

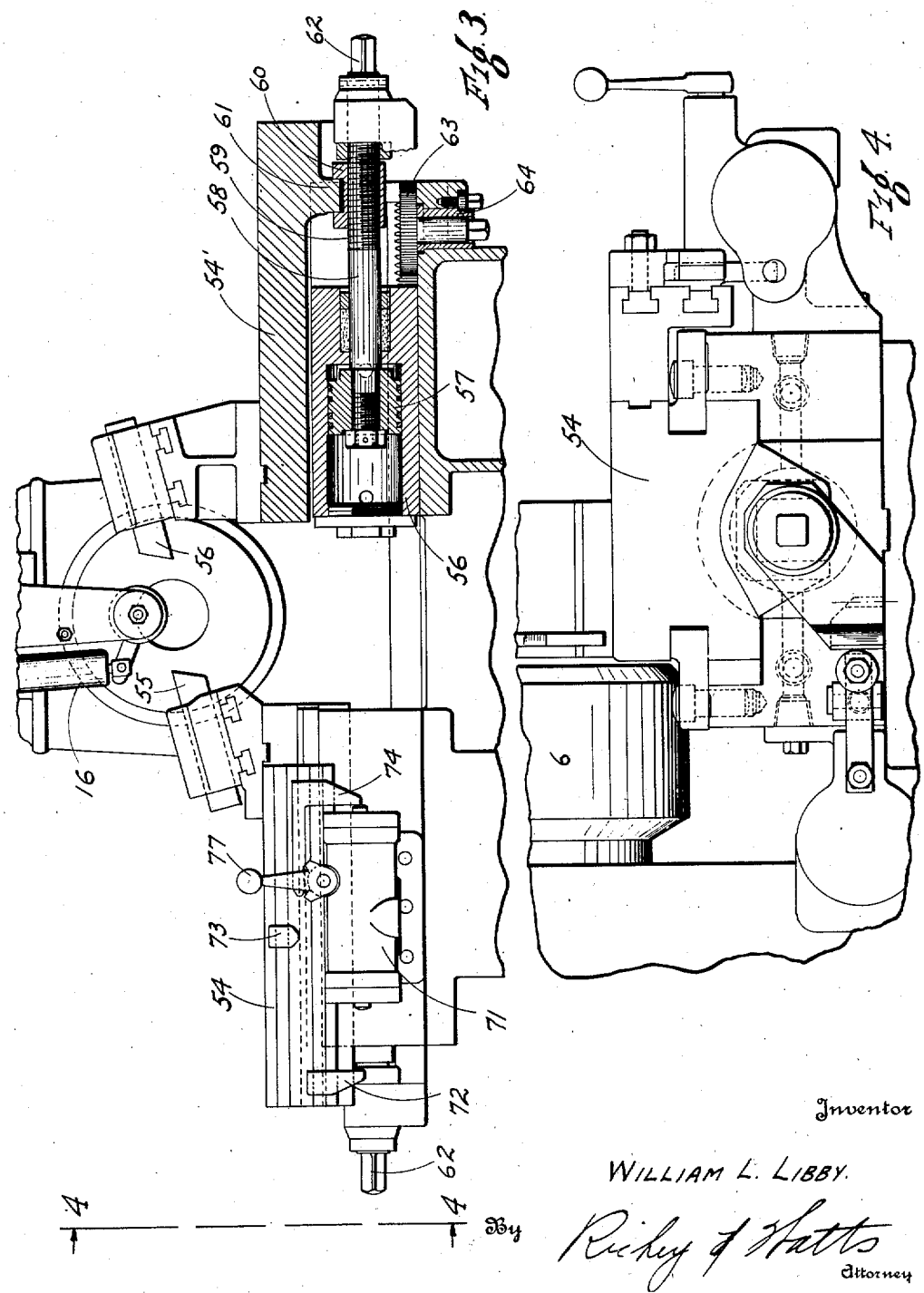

1,972,595

UNITED STATES PATENT OFFICE 1,972,595

AUTOMATIC CUT-OFF MACHINE

William L. Libby, Cleveland, Ohio, assignor to John G. Oliver, doing business as Bardons & Oliver, Cleveland, Ohio Application June 30, 1931, Serial No. 547,950

15 Claims. (Cl. 82—2)

This invention relates to machine tools and more particularly to automatic cutting-off machines, the essential operations of which are effected by fluid pressure.

In machine tools for cutting off measured lengths of tubular or bar stock it is advantageous to provide a hollow rotating spindle, through which the stock is fed, together with means for feeding the stock through the hollow spindle, measuring off the desired length, and gripping the stock in a suitable chuck during the cutting operation. In United States Patent No. 1,772,148, issued on August 5, 1930 to E. J. Hornberger, there is illustrated and described a cutting off machine in which fluid pressure is used to control the stock feeding and chucking operations and wherein fluid pressure may be used to cause the feeding movement of the tool, if desired. However, this machine must be manually controlled and is not a full automatic machine which will operate continuously to cut off successive pieces of stock without attention from the operator.

It is among the objects of my invention to provide a full automatic cut-off machine which is particularly susceptible to economical manufacture and maintenance, and which may be easily adjusted to meet various operating conditions.

Another object of my invention is the provision of a cut-off machine in which the tool slide is operated by hydraulic pressure and in which the stock feeding, chucking and measuring operations are controlled by air pressure.

Other objects of my invention are: the provision of a cut-off machine which may be operated as a full automatic machine to continuously cut off successive pieces of stock or which may be operated as a single cycle machine in which the machine, after it is started, completes a single cutting operation and then stops; the provision of a cut-off machine having a hydraulic-pressure actuated tool slide in which the movement of the tool slide is adapted to control the operation of fluid pressure actuating mechanism for carrying out the stock feeding, chucking and measuring operations; the provision of a full automatic cut-off machine which has no cams and which may be quickly and easily set up by a relatively unskilled operator; the provision of an improved stock measuring device for machine tools; the provision of a fluid pressure system for actuating the stock feeding apparatus, the stock chuck and the stock measuring stop, all of which are controlled by a single valve and operate in the proper timed relation.

The above and other objects of my invention will be seen from the following description of an automatic cut-off machine embodying my improvements, reference being had to the accompanying drawings, in which—

Fig. 1 is a side elevation of my cut-off machine with a piece of tubular stock extending through the hollow spindle and the stock measuring stop in measuring position.

Fig. 2 is an end elevation of the machine shown in Fig. 1, taken from the cutting end of the machine.

Fig. 3 is an enlarged fragmentary end view, partly in section, illustrating the tool slides and their operating cylinders.

Fig. 4 is a front view, slightly enlarged, taken on line 4—4 of Fig. 3 and illustrating the front tool slide and control valves.

Fig. 5 is a fragmentary plan view partly cut away to illustrate the tool slides and equalizer hook-up, together with the air valve which controls the operation of the stock feeding, chucking and measuring mechanism.

Fig. 6 is an enlarged front elevation of my improved stock measuring stop.

Fig. 7 is an end view partly in section of the stock measuring stop illustrated in Fig. 6.

Fig. 8 is a diagrammatic layout of the hydraulic tool slide actuating system and the fluid pressure operated stock feeding, chucking and measuring system.

Fig. 9 is a diagrammatic illustration of a modified form of the fluid pressure operated stock feeding, chucking and measuring system.

Fig. 10 is an end view partly in section and generally similar to Fig. 7 but illustrating a modified form of apparatus for actuating the stock measuring stop which is particularly adapted for use with the hook-up shown in Fig. 9.

Fig. 11 is a horizontal cross section of the control valve for the stock feeding, chucking and measuring apparatus.

Fig. 12 is an end view, not in section, of the air valve illustrated in Fig. 11 and taken on line 12—12 of Fig. 11.

Referring now particularly to Figs. 1 and 2, my improved cut-off machine includes a base 1 and a housing 2 extending upwardly from the base. The main drive motor 3 is mounted on the base within the housing 2 and is connected to drive change speed gears within the gear box 4 through the chain 5. A driving connection from the change speed gears to the hollow rotating spindle of the machine is effected through suitable gears (not shown). One end of the hollow spindle carries the stock chuck 6. The stock 7, which as illustrated, is a piece of tube or pipe, extends through the hollow spindle of the machine and is adapted to be held during the cutting operation by the chuck 6.

To feed the stock through the spindle of the machine and to actuate the chuck 6, I have provided the fluid pressure actuated roller feed mechanism indicated at A and the cylinder 8. This feeding and chucking apparatus may be generally similar to that shown and described in the Hornberger Patent No. 1,696,037 of December 18, 1928 and the Hornberger Patent No. 1,772,148 of August 5, 1930. The cylinder 8 contains a piston having a piston rod 9 which is connected through suitable links and connecting rods to operate the stock chuck and roller feed mechanism. Briefly, when the piston rod 9 moves to the right (Fig. 1) the chuck 6 is actuated to grip the stock while the roller feed mechanism A is disengaged from feeding contact with the stock. Conversely when the piston rod 9 moves to the left the chuck 6 is released and the roller feed contacts with the stock to feed it through the hollow spindle of the machine.

The stock measuring stop S is supported by a bracket 10 which is mounted on the bar 11. The bracket 10 is adapted to be clamped in the desired position on the bar 11 by means of screws 12 and the bar 11 may also be moved in its supporting members 13 upon loosening the screws 14. The above construction permits the stock measuring stop to be set to measure any desired length of piece and, as the bracket 10 may be turned on the bar 11 when the screws 12 are relieved, the stop may be set to accommodate any desired diameter of stock.

A flexible conduit 15 extends from the operating cylinder 16 of the stock measuring stop to the valve which controls the flow of fluid under pressure to the cylinder. This conduit is preferably coiled about the bar 11 as illustrated in Fig. 1, so that the stop may be moved toward or away from the cutting tools without interfering with the operating connections of the mechanism.

Referring now particularly to Figs. 6 and 7, the bracket 10 has a bearing portion 17 at its lower end. A shaft 18 is carried in this bearing and is adapted to have limited rotational and longitudinal movement therein. A disc 19 having inclined cam surfaces 20 is secured to the shaft 18. Co-acting cam surfaces 21 are formed on the end of the bearing portion 17 of the bracket 10 and a free rotating anti-friction disc 22 is mounted on the shaft 18 between the cam member 19 and the end of said shaft. A lever 23 is secured to the cam member 19 and has a pivoted connection with the lower end of the piston rod 24. The upper end of the piston rod 24 carries the piston 25 which is adapted to reciprocate within the cylinder 16. A spring 26 normally maintains the piston 25 in its upper position (Fig. 7) and when the piston is in this position the measuring face 27 of the anti-friction member 22 is in its extended or stock measuring position.

When fluid pressure is applied to the top of the piston 25 through the conduit 15 the piston, piston rod and lever 23 will be forced downwardly against the pressure of the spring 26. This downward movement of the lever 23 will turn the cam member 19 and its cam surface 20 will co-act with the cam surface 21 on the bracket 10 permitting the shaft 18 and its associated parts to be withdrawn from stock measuring position by the spring 28 which is disposed in a suitable recess in the bearing member 17 and tends to maintain the cam surfaces 20 and 21 always in engagement.

It will be seen from the above description that, as long as pressure is not applied to the top of the piston 25, the spring 26 will hold the face 27 in stock measuring position and that when sufficient fluid pressure enters the cylinder through the conduit 15 the piston 25 will be actuated to effect withdrawing movement of the face 27.

In Fig. 10 a modified form of stock measuring stop actuating device is illustrated. This form is designed to be used with the fluid pressure hook-up illustrated in Fig. 9 of the drawings. The mechanism is essentially the same with the exception that a valve member 25' is mounted on the upper end of the piston 25. This valve seats on a corresponding valve seat in the end cap 29 which has a relatively small opening 30 to the source of fluid pressure. In this modification the spring 26 normally maintains the valve member 25' on its seat and when fluid pressure is conducted thereto through the conduit 15 it has a relatively small area against which to exert its force. This area is of such size that the pressure of the spring 26 will not be overcome until the fluid pressure in conduit 15 has reached a certain predetermined value. As soon as this value is reached the valve will be opened and the pressure exerted on the full area of the piston 25, thus causing the stock measuring stop to move. The operation of this apparatus in connection with the hook-up illustrated in Fig. 9 will be fully described later.

In Fig. 11, I have illustrated a preferred form of fluid pressure control valve for controlling the operation of the stock feedings, chucking and measuring apparatus. This consists essentially of a housing 31 having two cylindrical chambers 32 and 33. The pilot valve member 34 is adapted to operate in the cylinder 33 and is normally maintained in the position illustrated by the spring 35. When in this position the air or other fluid pressure is conducted through the opening 36, the space around the reduced portion 34' of the pilot valve plunger, and the passage 37 to the left hand end of the cylinder 32. This pressure moves the main valve member 38 to its farthest right position (Fig. 11). When in this position the air from the source of supply will pass through the opening 36 into the space around the reduced section 38' of the valve member 38 and out through the passage 39 to one end of the cylinder 8. The other end of the cylinder 8 is connected to the passage 40 and the exhaust air therefrom will pass into the space about the reduced portion 38'' of the piston valve 38 and thence out through the port 41 and the exhaust chamber 42, to the atmosphere.

It should be noted that when the pilot valve member 34 is in the position shown in Fig. 11 a direct connection is completed between the source of pressure 36 and the opening 43. This opening is connected by suitable piping to the operating cylinder 16 of the stock measuring stop.

When the projecting end 44 of the pilot valve 34 is pushed inwardly, the valve connections are changed and the source of pressure is connected directly to the right hand end of the chamber 32 through the space about the reduced section 34' of the pilot valve and the passage 45. This application of pressure moves the piston valve 38 to the left hand end of the cylinder 32 and connects the passage 40 to the source of pressure while connecting the passage 39 to the atmospheric exhaust. At the same time the movement of the pilot valve 34 to the right closes off the opening 43 from the source of supply of pressure and opens it to the atmosphere.

Referring now to Fig. 8 and particularly to the air line connection indicated in dotted lines, it is seen that the fluid under pressure is conducted to the opening 36 through a pipe 46. The pipe 47 connects one end of the cylinder 8 to the opening 39 and the pipe 48 connects the piston rod end of the cylinder 8 to the opening 40 in the valve housing 31. A pipe 49 leads from the opening 43 in the valve housing 31 to the stock measuring stop operating cylinder 16.

The operation of the fluid pressure actuated stock feeding, chucking and measuring apparatus is as follows:

When the valve is in the position shown in Fig. 11 the source of supply of fluid pressure is connected to the stock measuring stop operating cylinder 16 and the piston 25 will be pushed downwardly and will maintain the measuring face 27 of the stop in its withdrawn position. The air pressure will also be directly connected through the port 39 in the housing 31 and the pipe 47 to the left hand end of the cylinder 8 (Fig. 1). This connection forces the piston in the cylinder 8 to the right and maintains the stock feeding rolls out of contact with the stock and the chuck 6 in its stock gripping position. When these parts are in the above noted position the cutting operations of the machine take place. When the pilot valve 34 is moved to its other position by movement of tool slide, as will be more fully described later, the stock measuring stop operating cylinder 16 is connected to the atmosphere through the passages 50 and 51 in the valve housing 31 and the spring 26 will move the measuring face 27 into its extended or measuring position. At the same time the main piston valve 38 will be thrown to the left hand end of the cylinder 32 (Fig. 1) and the right hand or piston rod end of the operating cylinder 8 will be connected to the pressure supply through the passage 40 in the valve housing 31 and the pipe 48. This connection will cause the piston rod 9 to move to the left (Fig. 1) which movement will open the jaws of the chuck 6 and cause the feeding rolls to engage the stock thus feeding it through the hollow spindle of the machine until it strikes the measuring face 27 of the stock measuring stop.

The above description of the operation of this part of my invention may be summarized by stating that when the air valve is in the position shown in Fig. 11 the feed rollers are withdrawn from contact with the stock, the chuck grips the stock, and the stock measuring stop is in its withdrawn or non-measuring position. When the pilot valve 34 is moved the main valve 38 is also moved by fluid pressure and the fluid pressure connections are such that the stock measuring stop is moved into measuring position, the chuck 6 is released and the roller feed mechanism is forced into feeding contact with the stock 7.

The operation of the feeding, chucking and measuring apparatus is substantially the same when the hook-up illustrated in Fig. 9 and the stop actuating mechanism shown in Fig. 10 are employed. In this form the pipe 52 which leads to the cylinder 16 is connected into the pipe 47. Thus, whenever the main valve member 38 is in position to direct the fluid pressure to the cylinder 8 to cause the gripping action of the chuck to take place, the same pressure will be applied to the cylinder 16 to move the piston 25 downwardly and the measuring face 27 out of measuring position. The area of the small valve 25' is such that the pressure thereon will not be built up to a value sufficiently great to overcome the spring 26 until the movement of the piston within the cylinder 8 is stopped by virtue of the chuck jaws having fully clamped the stock. Thus, it will be seen that the measuring face 27 will not be withdrawn from measuring position until after the chuck 6 has gripped the stock. This in effect is a self timing arrangement whereby it is not necessary to utilize the separate connections between the cylinder 16 and the source of supply of pressure which must necessarily be used with the apparatus shown in Figs. 6, 7, 8 and 11.

The above noted timing of the stock stop so that it is not withdrawn from measuring position until the chuck is fully gripped is effected in apparatus shown in Figs. 6, 7, 8 and 11 by having the passage 53 in the valve housing 31 slightly offset from the passage 37 so that when the pilot valve 34 moves from its right hand position into the position shown in Fig. 11 the closure member 34" first opens the passage 37 to the fluid pressure thus causing the main valve 38 to move to the right and the pressure to be applied to the cylinder 8 through the passage 39 and the pipe 47, which application of pressure causes the chuck to immediately grip the stock, and then opens the port 53 to permit the pressure to be applied to the cylinder 16 of the stock measuring stop. Thus the apparatus will be positively timed so that the chuck first grips the stock and then the pressure is applied to the cylinder 16 to cause the measuring face 27 of the stock stop to be withdrawn from measuring position.

In the cut-off machine shown in the drawings two tool slides 54 and 54' are employed. The front tool slide 54 carries a tool 55 and the rear slide 54' carries a tool 56. These slides are adapted to move simultaneously toward and away from the center line of the stock whereby the cutting operations are accomplished. As best seen in Figs. 3 and 5 each slide is equipped with a separate hydraulic cylinder and piston arrangement for giving it its feeding and return movement. In Fig. 3 the operating apparatus for the rear slide 54' is clearly shown in section and a description of this will suffice for the operating mechanism for both slides, as they are substantially the same. The cylinder 56 is mounted on the frame of the machine directly beneath the slide 54'. The piston 57 is adapted to reciprocate in the cylinder and carries a piston rod 58 which extends to the outer end of the slide 54'. This piston rod is threaded at its outer end as indicated at 59 and carries a slotted nut 60 which engages the threads 59. A yoke 61 extends downwardly from the bottom of the slide 54' and is adapted to engage the groove in the nut 60 thus forming an operating connection between the piston and piston rod and the slide 54'. Exactly the same structure may be provided for the slide 54 and it will be seen that, by turning the squared ends 62 of the piston rods, the tool slides may be accurately adjusted relative to each other and to their piston. As will be more fully explained later the hydraulic system is so connected that the operating pistons for both the slides 54 and 54' move together, i. e. when the piston 57 is on its feeding movement to feed the tool 56 into the work, the piston which actuates the slide 54 is also on its feeding stroke and moves the tool 55 against the work. By providing the threaded nut and piston rod adjustment, however, it is possible to accurately control the fine adjustment of the tools 55 and 56 so that each tool will do its properly proportioned share of the cutting.

In order to positively prevent any possible inaccuracies in the movement of the two tool slides 54 and 54' an equalizer system is provided. This consists of a pinion gear 63 which is rotatably mounted in a suitable bearing 64 in the base of the machine below the rear tool slide 54'. A relatively short rack member 65 is secured to and moved with the piston rod 58. This rack engages the pinion 63 on one side and the rack teeth 66 on the equalizer bar 67 engages the pinion on the opposite side. This equalizer bar 67 has a sliding fit in the frame of the machine below the slide 54' and is connected at its opposite end to the piston rod 68 which moves the slide 54. As is best seen in Fig. 5 the equalizer bar 67 does not engage the threads on the piston rod 68 but is held in place and prevented from longitudinal movement relative to the piston rod by means of the nuts 69 and 70. The short rack member 65 is secured to the piston rod 58 in like manner. It will be seen that this equalizer arrangement positively prevents either one of the piston rods 58 or 68 and their tool slides 54' and 54 from moving without corresponding movement of the other piston rod and slide. However, as above described, the slides may be independently adjusted by means of the screw threaded piston rod and tool slide connection.

Referring now to Fig. 8 the full lines indicate the piping arrangement for the hydraulic system which operates the tool slides. As this particular system forms no part of the present invention it will be rather briefly described. It will be understood that any suitable hydraulic system which will accomplish the results desired may be utilized in connection with my apparatus.

The control valve 71 is mounted on the frame of the machine beside the tool slide 54 and is adapted to be actuated by suitable dogs 72, 73 and 74, which are adjustably mounted on the tool slide 54. A gear pump 75 is adapted to be driven by the main driving motor of the machine and supplies the fluid, preferably oil, under pressure which gives the rapid forward traverse and the quick return stroke of the tool slides. The final relatively slow and accurate feeding movement of the tool slides is effected by fluid under pressure which is supplied by the pump 76 which may conveniently be driven from the rotating spindle of the machine. This pump 76 is preferably of a type which may be accurately and easily adjusted to deliver varying quantities of oil to the tool slide operating cylinders. The valve 71 is so constructed, and the dogs 72, 73 and 74 are so adjusted, that oil from the pump 75 forces the pistons toward each other at a relatively high speed until the tools 55 and 56 are about to enter the work. Then the valve 71 is shifted by means of a suitable dog on the tool slide 54 and the pump 76 is connected to the cylinders to give the desired slow feeding movement of the tools into the work. As soon as the feeding stroke is completed another dog on the tool slide 54 moves the valve 71 to cause oil from the pump 75 to enter the cylinders to force the slide actuating pistons apart at a relatively high rate of speed. When the slides are withdrawn a sufficient amount the flow of oil from the pump 75 to the cylinders is reversed by another movement of the valve 71, also caused by a suitable dog on the slide 54, and the quick forward stroke of the tool slides begins. Thus it will be seen that a continuous cycle of rapid forward traverse, slow tool feeding movement and rapid backward travel of the tool slides 54 and 54' will be carred out as long as the pumps 75 and 76 are operating.

If it is desired to have the machine complete only a single cycle, that is, a single cutting operation, and then stop, it is only necessary to disconnect or remove the dog 74. In this mode of operation the tool slides must be started on their cycle of movement by manual operation of the valve 71 through the lever 77.

Referring now to Fig. 5, a bell crank lever 78 is pivotally mounted on a bracket 79 which is secured to the frame of the machine. One end of this bell crank lever 78 carries an adjustable contact screw 80, which is adapted to engage the extending end 44 of the pilot valve member 34 and the other end carries an adjustable contact nut 81. This end of the equalizer bar 67 which is connected to the piston rod 68, is beveled as at 82 and it will be seen that when the slide 53 and bar 67 move away from the work the beveled portion 82 of the bar 67 will strike the nut 81, thus swinging the bell crank 78 on its pivot causing the pilot valve member 34 to be pushed to its opposite position. When this occurs the stock feeding and measuring operations take place. When the bar 67 starts to move in the opposite direction at the beginning of the rapid forward traverse of the slide 54, the nut 81 will be disengaged from contact with the bar 67 and the spring 35 will force the pilot valve into the position shown in Fig. 11, which movement will cause the chuck to grip the stock, the feeding rolls to be removed from contact with the stock and the stock measuring stop to be withdrawn from its measuring position.

From the above description it will be seen that the machine will operate in a completely automatic manner to continuously measure and cut off pieces of stock of the desired length. The operation of the various elements of the machine is controlled entirely by the movement of the tool slide 54 and the equalizer bar 67. The only adjustment necessary to accommodate different cutting depths or different sizes of stock is that of the positions of the dogs 72, 73 and 74 to cause the tool slides to have the desired movement. The rate of speed of the feeding movement of the tools is controlled by the adjustment of the pump 76. By adjusting the nut 81 and the screw 80 the time of operation of the air valve is regulated.

It will be seen by those skilled in the art that although I have described a particular form of my invention in some detail, modifications and variations may be made in the various parts shown and described without departing from the spirit of my invention. I do not, therefore, limit myself to the exact form herein shown and described, but claim as my invention all embodiments coming within the scope of the appended claims.

I claim:

1. In a machine tool of the class described having a movable tool carrying slide, the combination of a stock chuck, stock feeding means, a retractable stock measuring stop, fluid pressure actuated means for operating said stock chuck, feeding means and measuring stop, hydraulic means for operating said tool slide, and valves adapted to be actuated by movement of said tool slide, for controlling said fluid pressure means and said hydraulic means.

2. In a machine tool having fluid pressure operated stock feeding, chucking and measuring mechanisms and a fluid pressure operated tool slide, a valve for controlling the operation of said stock feeding, chucking and measuring mechanisms, a valve for controlling the operation of said tool slide and means on said tool slide for moving said valves whereby the stock feeding, chucking and measuring operations and the feeding and return movements of said tool slide take place at definite predetermined times to effect continuous operation of the machine tool.

3. In a machine tool, the combination of a hollow rotatable spindle and means for driving same, fluid pressure controlled means for feeding stock through said spindle, fluid pressure actuated means for gripping said stock, a fluid pressure actuated stock measuring stop, a source of supply of fluid under pressure, a control valve for said fluid pressure actuated mechanisms, a system of fluid pressure conducting conduits extending from said source of supply of fluid under pressure to said control valve and from said control valve to the fluid pressure actuated means for operating said stock feeding, chucking and measuring mechanisms, a tool slide adapted to carry a cutting tool and to move the cutting tool into and out of cutting position, a hydraulic cylinder, a piston in said cylinder adapted to be moved by hydraulic pressure, operating connections between said piston and said tool slide, a source of supply of hydraulic pressure, a valve for controlling the operation of said tool slide, a system of pressure conducting conduits extending from said source of supply of hydraulic pressure to said last named valve and from said last named valve to said cylinder, and a plurality of dogs on said tool slide adapted to engage and operate said control valves at certain predetermined points in the movement of said tool slide whereby a continuous operation of the machine is effected.

4. In a machine tool, the combination of a tool slide, stock feeding, chucking and measuring mechanisms, a pair of independent fluid pressure systems each including a control valve, one of said systems being adapted to control the operation of the stock feeding, chucking and measuring mechanisms and the other of said systems being adapted to control the movements of the tool slide of the machine and means on said tool slide for operating said control valves.

5. In an automatic machine tool of the class described, the combination of fluid pressure actuated means for feeding and chucking the stock, a source of supply of fluid under pressure, operating means for actuating the tool slide of the machine, a source of supply of fluid under pressure, independent of said first named source of supply of fluid under pressure, for operating said tool slide moving means, and independent valve means, each adapted to be operated by movement of said tool slide, for controlling the flow of fluid under pressure from each of said sources of supply of fluid under pressure to said fluid pressure actuated means.

6. In an automatic machine tool, the combination of an automatic stock feeding and chucking mechanism, a stock measuring stop adapted to be withdrawn from measuring position, a tool slide adapted to be moved toward and away from the stock and fluid pressure actuated means, adapted to be controlled by movement of said tool slide for operating said stock feeding and chucking mechanism, said stock measuring stop and said tool slide.

7. In combination with a machine tool of the class described, a stock measuring stop adapted to be withdrawn from stock measuring position, fluid pressure actuated means for withdrawing said stop from measuring position, a control valve for said fluid pressure actuated means, and means responsive to movement of the tool slide of the machine of actuating said control valve.

8. In combination with a machine tool, a stock measuring stop comprising an adjustable support, a longitudinally movable shaft journaled in said support and carrying a stop member having a measuring face, a spring normally tending to maintain said stop member in measuring position, fluid pressure actuated means for withdrawing said stop member from measuring position and valve means operated by movement of the tool slide of the machine tool for controlling said fluid pressure actuated means.

9. A machine tool of the class described having in combination, a pair of tool slides movable toward and away from the work, equalizing connections between said tool slides fluid pressure cylinders and pistons therein, independently adjustable connections between said pistons and said tool slides, a pump, fluid pressure conducting connections between the pump and cylinders, a control valve in said connections and means, operable by movement of one of said tool slides, for operating the control valve.

10. A machine tool of the class described having in combination, a pair of tool slides, each movable toward and away from the work and disposed on opposite sides of the work, a pair of fluid pressure cylinders and pistons therein, adjustable connections between said pistons and said tool slides, an equalizing connection between said pistons whereby each piston partakes of the same degree of movement as the other and valve means, operable by movement of said tool slides, for controlling the movement of said pistons in said cylinders.

11. In a machine tool of the class described having a movable tool carrying slide, a stock chuck, stock feeding means, stock measuring means, fluid pressure actuated means for operating said stock chuck, stock feeding means, stock measuring means and said tool slide, and valve means adapted to be actuated by movement of said tool slide for controlling said fluid pressure actuated means.

12. In an automatic machine tool having fluid pressure operated stock feeding, chucking and measuring mechanisms and a fluid pressure operated tool slide, valve means for controlling the operation of said stock feeding, chucking and measuring mechanisms and said tool slide and means operable by movement of said tool slide for actuating said valve means whereby the stock feeding, chucking and measuring operations and the feeding and return movements of said tool slide take place at definite predetermined times to effect continuous operation of the machine tool.

13. In a machine tool of the class described, a tool slide, a stock measuring stop, a fluid pressure cylinder, a piston in said cylinder, operating connections between said piston and said stop, valve means for controlling the flow of fluid under pressure to said cylinder and valve actuating means adapted to be operated by movement of said tool slide.

14. In a machine tool of the class described having a movable tool carrying slide, a stock chuck, stock feeding means, fluid pressure actuated means for operating said stock chuck, stock feeding means, and said tool slide, and valve means adapted to be actuated by movement of said tool slide for controlling said fluid pressure actuated means.

15. In a machine tool of the class described having movable tool carrying slide, the combination of a stock chuck, stock feeding means, fluid pressure actuated means for operating said stock chuck and stock feeding means, fluid pressure actuated means for operating said tool slide, and valves adapted to be actuated by movement of said tool slide for controlling said fluid pressure actuated means.

WILLIAM L. LIBBY.

DISCLAIMER 1,972,595.—*William L. Libby*, Cleveland, Ohio. AUTOMATIC CUT-OFF MACHINE. Patent dated September 4, 1934. Disclaimer filed August 4, 1936 by the assignee, *Bardons & Oliver, Inc.*

Hereby enters this disclaimer to claims 9 and 10.

[*Official Gazette August 25, 1936.*]

ated means for operating said stock chuck, stock feeding means, and said tool slide, and valve means adapted to be actuated by movement of said tool slide for controlling said fluid pressure actuated means.

15. In a machine tool of the class described having movable tool carrying slide, the combination of a stock chuck, stock feeding means, fluid pressure actuated means for operating said stock chuck and stock feeding means, fluid pressure actuated means for operating said tool slide, and valves adapted to be actuated by movement of said tool slide for controlling said fluid pressure actuated means.

WILLIAM L. LIBBY.

DISCLAIMER 1,972,595.—*William L. Libby*, Cleveland, Ohio. AUTOMATIC CUT-OFF MACHINE. Patent dated September 4, 1934. Disclaimer filed August 4, 1936 by the assignee, *Bardons & Oliver, Inc.*

Hereby enters this disclaimer to claims 9 and 10.

[*Official Gazette August 25, 1936.*]